US006542862B1

(12) United States Patent
Safford et al.

(10) Patent No.: US 6,542,862 B1
(45) Date of Patent: Apr. 1, 2003

(54) DETERMINING REGISTER DEPENDENCY IN MULTIPLE ARCHITECTURE SYSTEMS

(75) Inventors: Kevin David Safford, Fort Collins, CO (US); Patrick Knebel, Ft Collins, CO (US); Joel D Lamb, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/506,776

(22) Filed: Feb. 18, 2000

(51) Int. Cl.[7] .............................................. G06F 9/445
(52) U.S. Cl. ............................. 703/26; 703/14; 712/24; 712/32; 712/204; 712/212; 712/217
(58) Field of Search .............................. 703/24, 25, 26, 703/14; 712/24, 203, 212, 213, 214, 215, 222, 32, 204; 717/140

(56) References Cited

U.S. PATENT DOCUMENTS

| 5,517,628 A | * | 5/1996 | Morrison et al. ............ 395/375 |
| 5,574,927 A | * | 11/1996 | Scantlin ....................... 395/800 |
| 5,790,825 A | * | 8/1998 | Traut .............................. 395/385 |
| 5,859,999 A | | 1/1999 | Morris et al. ................ 395/565 |
| 5,860,017 A | | 1/1999 | Sharangpani et al. .. 395/800.23 |
| 5,983,334 A | * | 11/1999 | Coon et al. .................... 712/23 |
| 6,055,651 A | | 4/2000 | Sasaki et al. ................... 714/45 |
| 6,081,884 A | * | 6/2000 | Miller ........................... 712/204 |
| 6,170,997 B1 | * | 1/2001 | Glew et al. ................... 395/393 |
| 6,199,202 B1 | * | 3/2001 | Coutant et al. ............... 717/10 |
| 6,272,453 B1 | | 8/2001 | Hoerig et al. .................. 703/27 |

FOREIGN PATENT DOCUMENTS

| EP | 1107116 A2 | 6/2001 | ............. G06F/9/45 |
| WO | WO9722924 | 6/1997 | ............. G06F/9/34 |

OTHER PUBLICATIONS

Wolfe, A., "Patents shed light on Merced's Innards", Electronic Engineering Times, Feb. 15, 1999.
Wolfe, Alexander, Electronic Engineering Times, pp. 43–44, 1999.

\* cited by examiner

*Primary Examiner*—Kevin J. Teska
*Assistant Examiner*—Thai Phan

(57) ABSTRACT

An apparatus and method for determining register dependency in multiple architecture system. The system includes a microprocessor emulating an emulated instruction set using a native instruction set where the microprocessor contains at least one register. An execution engine provides the native instructions where each native instruction contains at least one register identifier. Flags are provided to each native instruction where each flag indicates whether a register identifier is valid. A bundler checks for dependency among the valid register identifiers in the native instructions.

19 Claims, 6 Drawing Sheets

DETERMINING REGISTER DEPENDENCY IN MULTIPLE ARCHITECTURE SYSTEMS

TECHNICAL FIELD

This invention relates to determining dependency between instructions to be executed. In particular, the invention relates to methods and apparatus for determining register dependency in multiple architecture systems.

BACKGROUND ART

Microprocessors exist that can implement multiple instruction sets by emulating one instruction set with another. One example is using a reduced instruction set computing (RISC) instruction set architecture (ISA) to implement an independent complex instruction set computing (CISC) ISA by emulating the CISC instruction with instructions native to the RISC instruction set. Instructions from the CISC ISA are called "macroinstructions." Instructions from a RISC ISA are called "microinstructions." Existing microprocessors do not implement these two architectures as efficiently as can be done.

To improve performance, it is desirable to execute multiple microinstructions in each clock cycle. A macroinstructions that is emulated by one or more microinstructions is called a "flow". The flows for the emulated instruction set are contained in a ROM called "microcode." Microcode, used to provide a sequence of microinstructions to emulate a given macroinstruction, cannot statically determine dependencies between a sequence of microinstructions that emulates a single macroinstruction, nor between a sequence of microinstructions that are used to emulate a sequence of macroinstructions. The primary reason behind this is due to register aliasing. Aliasing is a term that refers to filling in various parts of the microcode instruction with information directly from the macroinstruction, allowing different macroinstructions to be combined in the microcode. In order to allow two instructions from these two cases to be executed together, there is a need for some sort of hardware to do dependency checking.

One example of a CISC ISA is the IA-32 instruction set (also know as the x86 instruction set). IA-32 defines eight integer registers and eight floating point registers. In IA-32 computer systems, the floating point unit (FPU) comprises a plurality of data registers. Floating point instructions treat this plurality of data registers as a register stack. All addressing of the data registers is relative to the register on the top of the stack. The register number of the current top-of-stack register is stored in a stack TOS field. Thus, load operations decrement TOS by one and load a value in to the new top-of-stack register, which store operations, store the value from the current top-of-stack register in memory and then increment TOS by one. Most floating point instructions use this register stack.

In addition to the floating point top-of-stack pointer, the FPU architecture defines a floating point tag word (FPTW). The FPTW indicates whether a stack register is empty or not. An exception occurs when an operation attempts to read the contents of an empty stack register (known as "stack underflow") or tries to overwrite the contents of a full stack register (known as "stack overflow"). In order to properly emulate the IA-32 instruction set, both of these architectural features must be emulated.

More information regarding the FPU architecture can be found in the *Intel Architecture Software Developer's Manual, Volumes* 1–3, which are hereby incorporated by reference.

SUMMARY OF INVENTION

A method consistent with the present invention to determine register dependency. The method includes providing native instructions, where one or more of the native instructions emulate an emulated instruction and the native instruction contains at least one register identifier. In addition, providing at least one flag for each native instruction where each flags indicates whether one of the at least one register identifier is valid. Finally, checking for dependencies among the valid register identifiers in the native instruction.

An apparatus consistent with the present invention determines register dependency. The apparatus includes a microprocessor to emulate an emulated instruction set using a native instruction set, where the microprocessor includes at least one register. An execution engine to provide one or more native instructions where each native instruction contains at least one register identifier. One or more flags are provided to each native instruction where each of the flags indicate whether the register identifier is valid. A bundler to check for dependency among the valid identifiers in the native instructions.

Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
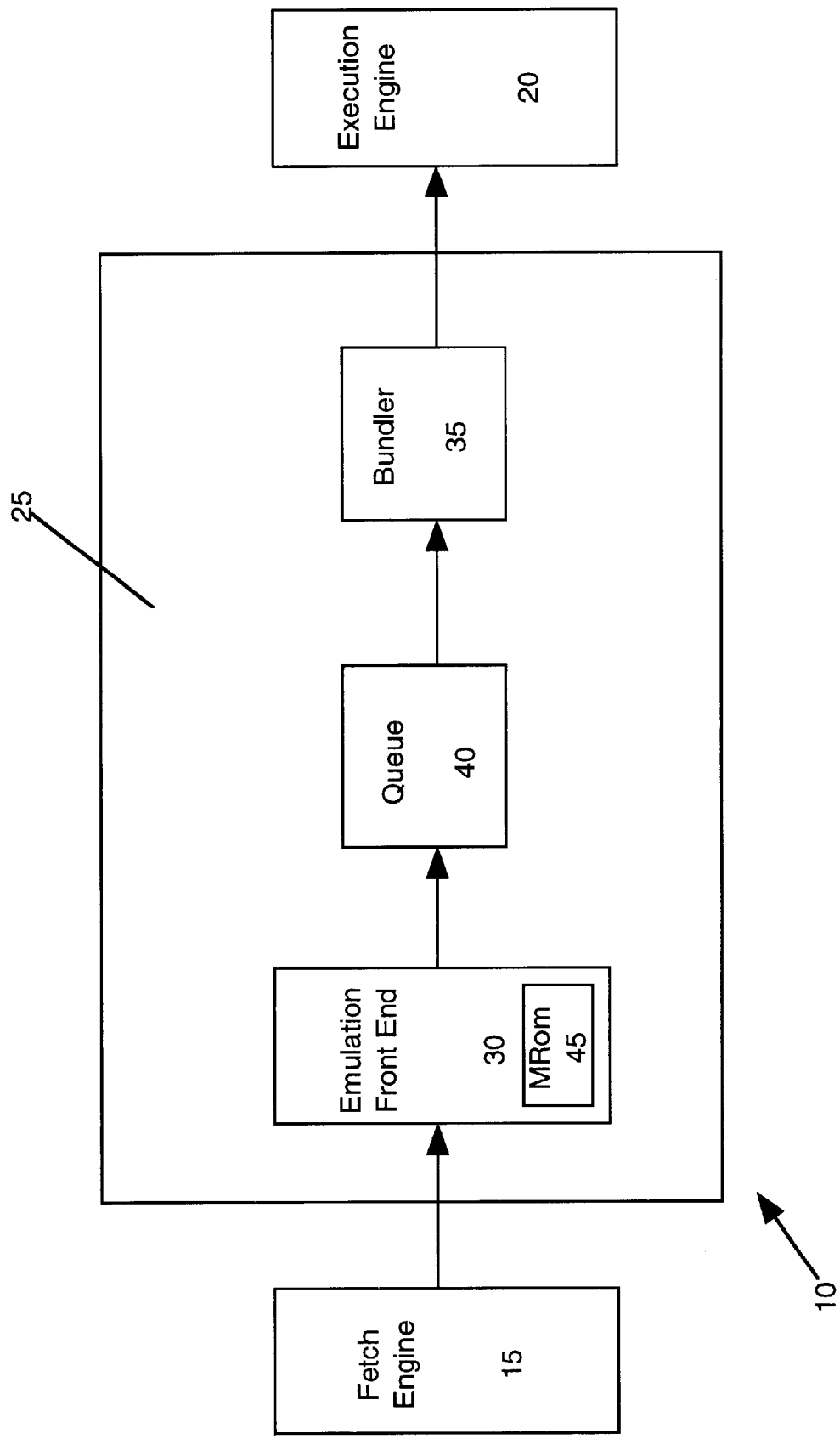
FIG. 1 is a block diagram of a RISC microprocessor showing details of processing RISC and CISC instructions.

FIG. 1 shows a block diagram of a RISC microprocessor 10, having a fetch engine 15 and a execution engine 20. In some implementations, such as the implementation shown in FIG. 1, the fetch engine 15 is separated from the execution engine 20 by a emulation engine 25. Some parts of the emulation engine 25 are an emulation front end 30 and a bundler 35. The emulation engine 25 processes a sequence of macroinstructions. Between the emulation front end 30 and the bundler 35 is a queue 40, also referred to as a buffer. The queue 40 buffers all the incoming microinstructions together and holds them until the bundler 35 is ready to receive them. By queuing the instructions, it allows microinstructions coming from two different macroinstructions to be input to the bundler 35.

Within the emulation front end 30 is a microcode ROM 45. The microcode ROM 45 delivers information to the bundler 35, specifically the instruction and control information from various parts of the machine. The function of the bundler 35 is to take the microinstructions and other information delivered from the fetch engine 15 to the emulation front end 30 within the emulation engine 25, convert this information into a valid microinstruction as defined by the RISC ISA and deliver to the execution engine 20 one or two microinstructions without violating any register dependencies.

Figure 2:
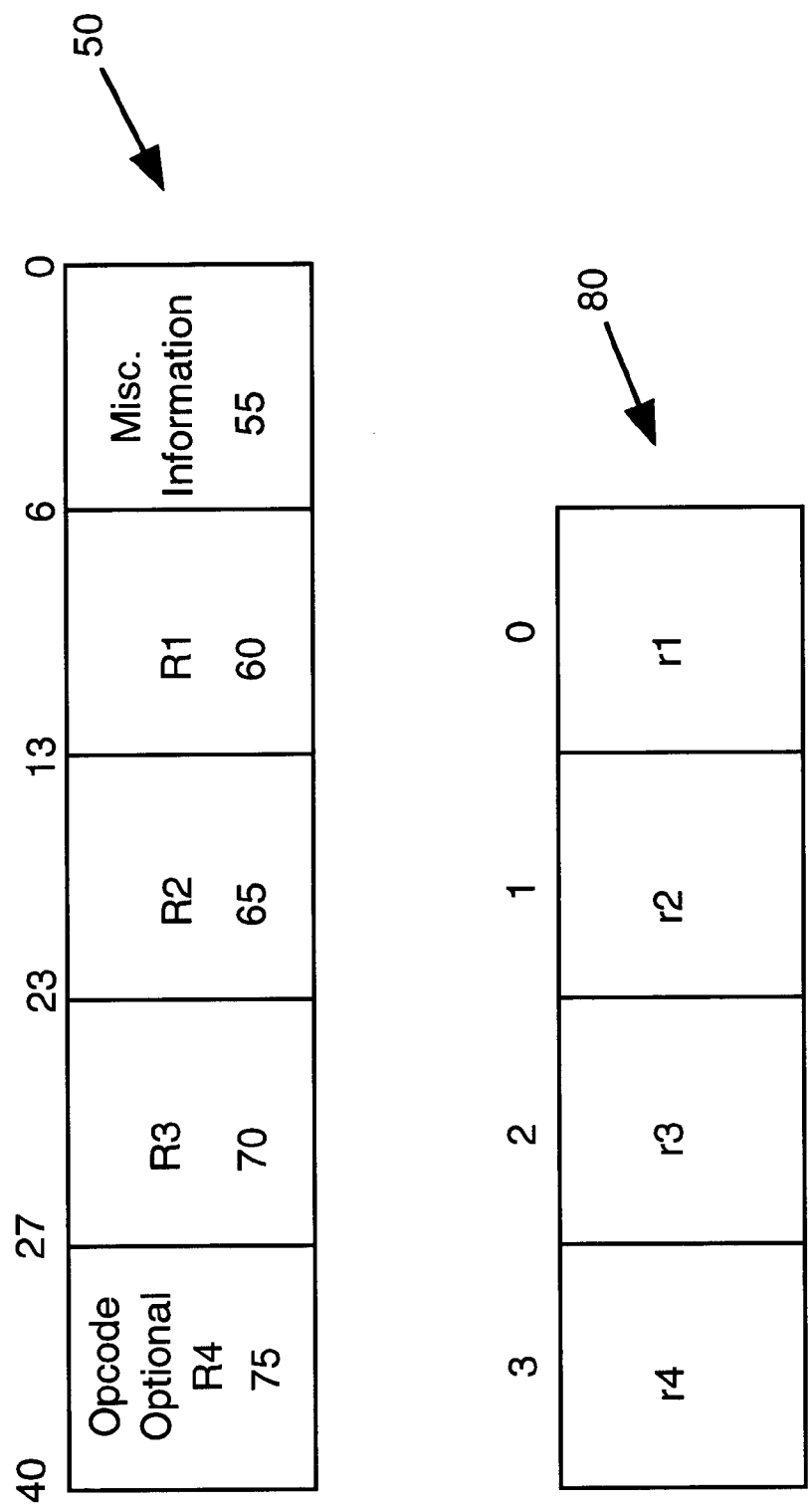
FIG. 2 is a diagram of an IA-64 instruction format and its corresponding register field valid bits.

One type of RISC ISA is an IA-64 native architecture. FIG. 2 illustrates a diagram of an IA-64 instruction. IA-64 instructions are 41-bit instructions known as a syllable 50 which are understood by the execution engine 20. The syllable 50 contains control information that notifies different parts of the execution engine 20 what needs to be done with each instruction.

The syllable 50 is broken into the following fields: Bits 5 through 0 contain miscellaneous information 55. Bits 12 through 6 are the register one (R1) field 60. The R1 field 60 is also known as a target register, which is the destination register for a particular instruction. Bits 19 through 13 are the register two (R2) field 65. The R2 field 65 is also known as a first source register. Bits 26 through 20 are the register three (R3) field 70. The R3 field 70 is also known as a second source register. Bits 40 through 27 are opcode bits 75. In addition, bits 33 through 27, for some instructions, are a third register source (R4). Thus, the target instruction is always found in R1 60 and the first, second and third source registers are always found in R2 65, R3 70 and R4 75. Every instruction in the IA-64 instruction set does not necessarily have register numbers in all four register fields. For example, one instruction may define a target (R1) and a source (R2), while another instruction defines a target (R1) and two sources (R2 & R3).

The bundler 35 has to determine how many microinstructions it will issue to the execution engine 20 per clock cycle. The bundler 35 issues either 0, 1 or 2 microinstructions per clock cycle. Zero instructions generally indicates the execution engine 20 is not allowed to do anything, i.e. the processor is stalled. One of the criteria used by the bundler 35 to determine if it can issue one or two instructions is to examine register dependencies between the two instructions. Prior art processors would decode the opcode field to determine which register fields are valid in order to avoid false dependencies. The present invention requires software or microcode to indicate valid register fields. To allow the bundler 35 to better determine register dependencies, microcode contains a four-bit field known as a register field valid 80. The 4-bit field of the register field valid 80 specifies whether each of the four separate fields (R1, R2, R3 and R4) within the 41-bit syllable 50 contains valid register identifiers. These bits, or flags 80 (r1, r2, r3 and r4) are not part of the syllable 50 that is understood by the native execute engine, but rather extra information provided by the microcode ROM 45 for every microinstruction.

Figure 3:
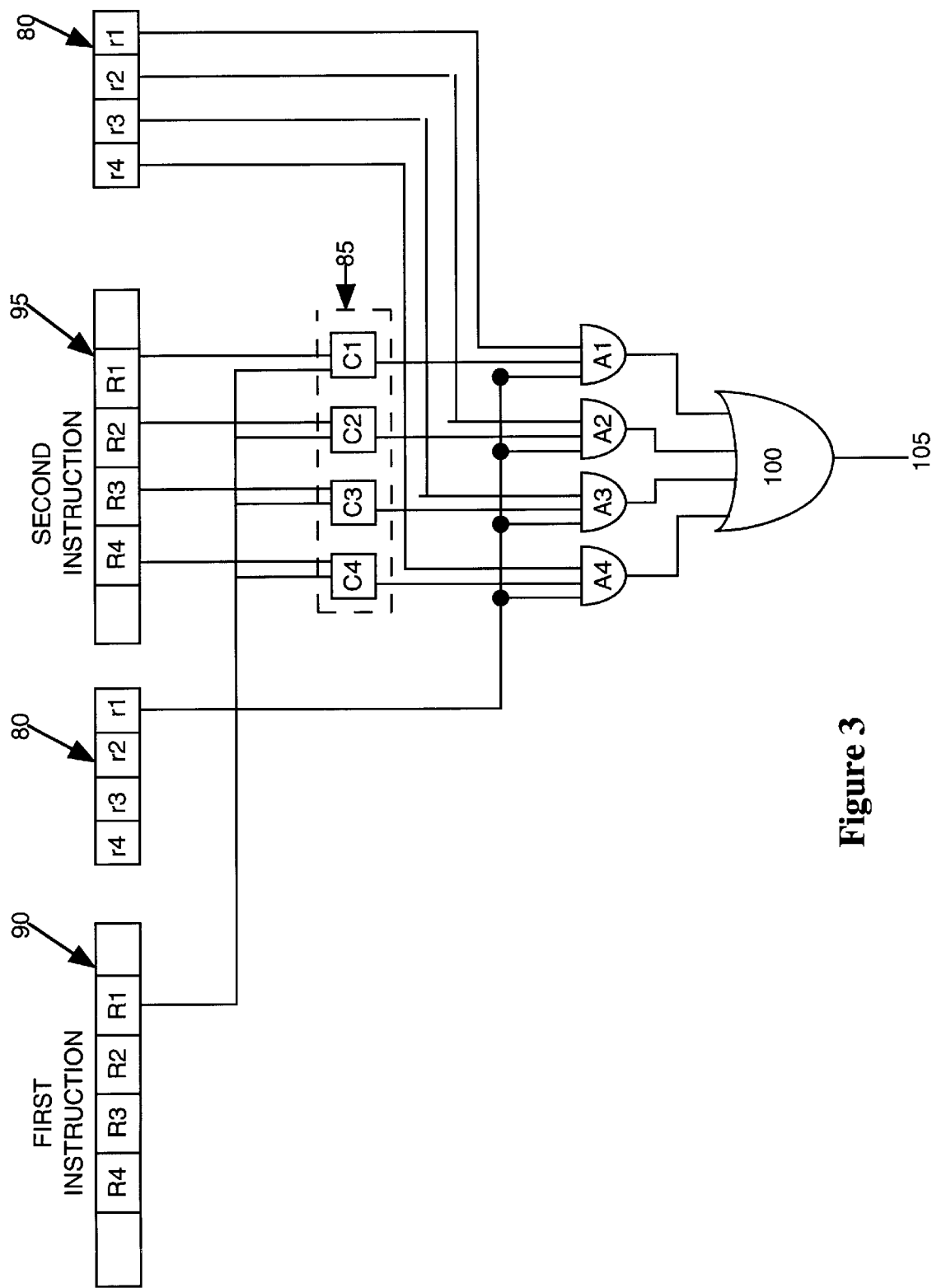
FIG. 3 is a diagram of a comparator checking for register dependencies.

Between the two microinstructions, the first instruction (older instruction), known as a first operation, is executed first and the second instruction (younger instruction), known as a second operation, is executed next. For the first operation, the bundler 35 looks at its target and checks if the second operation is using the target register of the first operation as a source register of the second operation. This is known as a read after write operation. Besides checking for read after write operations, the bundler 35 also checks for write after write operations. Here, the register dependency checks if the second operation is using the target register of the first operation as a target register for the second operation. Both the read after write and write after write operations are checked by a comparator located in the bundler 35. Once the bundler 35 performs register checking, it can determine to send one or two instructions. If the instructions do not have any register dependencies, the bundler 35 will issue two instructions in one clock cycle. Otherwise, the bundler 35 will issue the first instruction in the first cycle and then the second instruction in the next cycle. p FIG. 3 illustrates four 7-bit comparators 85 examining dependencies by register checking. For example, the comparator 85 determines if two microinstructions, such as, the first instruction 90 and the second instruction 95, have a register dependency. The target register R1 of the first instruction 90 is input to comparators C1, C2, C3 and C4. Also input to the comparators is: source register R4 of the second instruction 95 is input to comparator C4; source register R3 of the second instruction 95 is input to comparator C3; source register R2 of the second instruction 95 is input to comparator C2; and target register R1 of the second instruction 95 is input to comparator C1. The outputs of each comparator (C1, C2, C3 and C4) is input to corresponding AND gates A1, A2, A3 and A4. Also input to each AND gate (A1, A2, A3 and A4) is the corresponding register field valid bit r1 for the target register R1 of the older instruction 90. In addition, AND gate A4 has input r4, A3 has input r3, A2 has input r2 and A1 has input r1, where r1, r2, r3 and r4 are the corresponding register field valid bits for the second instruction 95. The output of the AND gates are input to an OR gate 100 whose output 105 indicates whether the two microinstructions have a register dependency.

When a microinstruction enters the bundler 35, it is impossible for the bundler 35 to know for each of the four register fields (R1, R2, R3 and R4) whether it's a floating point register or an integer register without decoding the instruction. If the instruction is not decoded, the bundler 35 may see false dependencies between a floating point register and an integer register. For example, if the first instruction refers to registers in a floating point register file and the second instruction refers to the same registers as in the first instruction, but in a integer register file, then there is no true dependency between the instructions. Both instructions can be issued in parallel with one another because they are referring to different register files.

To solve this false dependency problem, a register map is defined. The IA-64 architecture has 128 floating point registers and 128 integer registers. However, the emulation engine only requires 64 integer registers and only 64 floating point registers to correctly emulate the IA-32 instruction set. Therefore, microcode uses the most significant bit of the register field to define whether it is an integer or floating point register, effectively creating two banks of 64 registers. When microcode references the registers, it uses registers 0–63 to refer to integer registers and 64–127 to refer to floating point registers. Thus, the hardware in the bundler 35 requires no changes to solve the false dependency problem, since the comparison logic will see different register numbers for integer and floating point registers.

Since the execution engine 20 really wants to use the floating point registers 0 through 63 even though the microcode treats them as registers 64 through 127, the bundler 35 clears the most significant bit of the register field within the instruction before the instruction is sent to the execution unit 20. This simple hardware is all that is needed to convert the logical registers that the microcode issues to their corresponding physical locations.

Figure 4:
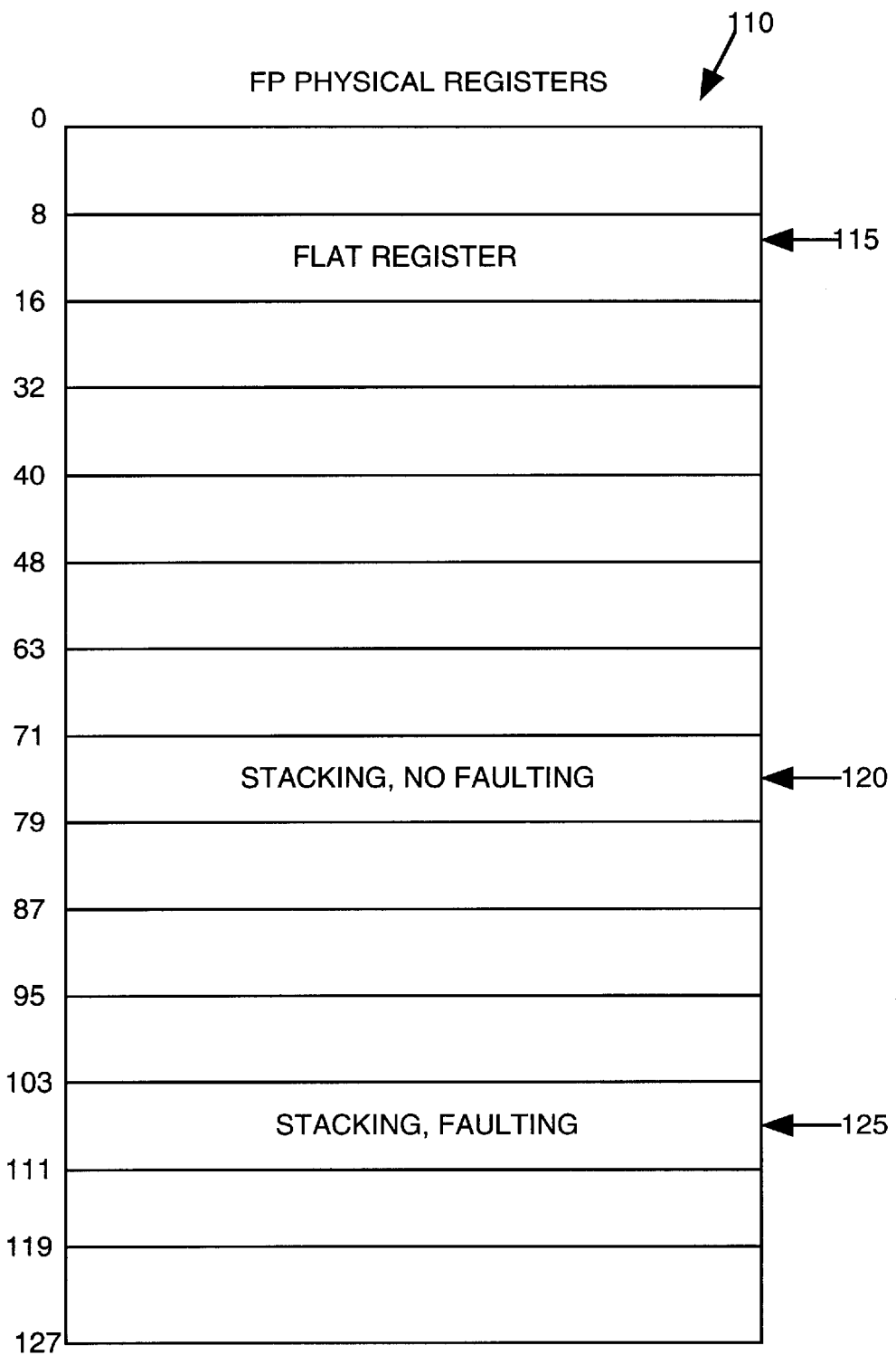
FIG. 4 is a diagram of a floating point physical register.

In order to correctly emulate the IA-32 floating point architecture, the emulation hardware must emulate a register stack. To do this, two pieces of information are kept in the bundler 35: the FP TOS pointer and the FPTW. FIG. 4 illustrates a FP physical register 110. The eight IA-32 FP registers are always kept in physical registers FR8–FR15 115. Based on the TOS pointer, stack location 0 (ST0) will map to one of the physical registers. If TOS is 0, then ST0 is actually FR8. If TOS is 5, then ST0 is actually FR13. The bundler 35 adds the TOS pointer and then does a modulus operation on it. The stacking function is: (Stack register+ TOS) modulo 8.

There are times when microcode wants to refer to the floating point registers in a stacked manner. Specifically, this is done when actually emulating IA-32 floating point instructions. When trying to emulate these instructions, the bundler 35 performs the stacking function. There are also times when microcode wants to actually get the contents of FR8–FR15 without the stacking.

Faulting, occurs when the system (1) reads an empty stack location or (2) writes a full stack location. There are times when microcode, to properly emulate an instruction, needs to read an empty location or write an already full location. This is known as "stacked without faults."

Thus, microcode has three modes to reference floating point registers, as shown in FIG. 4. The microcode indicates to the hardware (specifically the bundler 35) how it want the register reference treated: stacked with faults 125, stacked without faults 120, flat (or absolute) 115. Microcode refers to the register as stacked with no faults 120 with logical register numbers FP72–FP79. The stacked with faults 125 are referenced with logical register numbers FP 104–FP 111. Thus, to differentiate between these three modes, microcode uses the upper 4 bits of the register number, in effect creating an additional register map.

Figure 5:
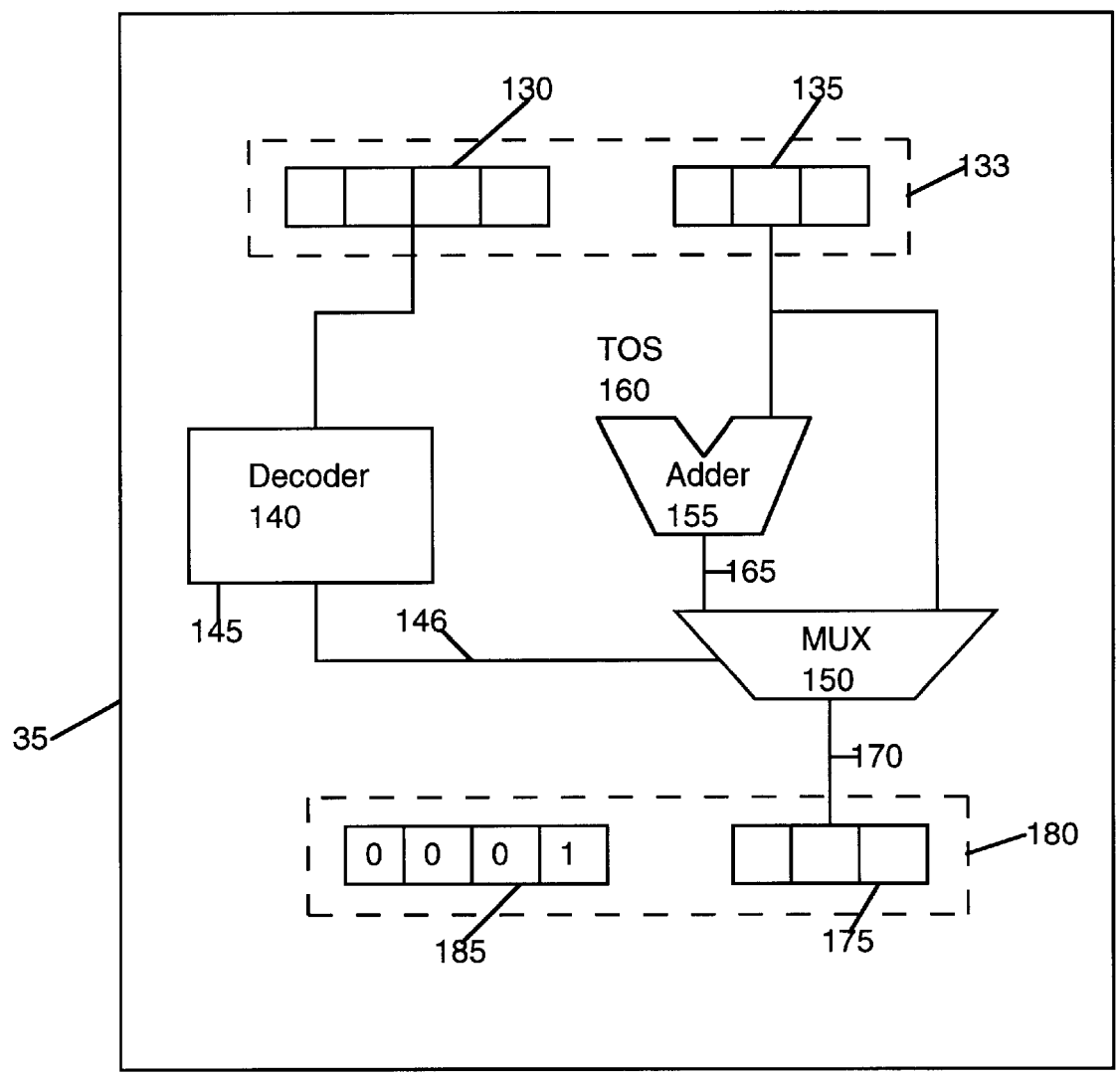
FIG. 5 is a block diagram of a bundler utilizing a register map.

FIG. 5 is a diagram of how the bundler 35 uses this register map to transform the logical register numbers 133 used by microcode to a physical register number 180 used by the native execution hardware. The 7-bit logical register number 133 is separated into the upper 4 bits 130 and the lower 3 bits 135. The upper 4-bits 130 enter a decoder 140 that determines if the bundler 35 should check for stack faults 145 and that creates a MUX select bit 146 that is used to select an input to a multiplexer 150. The lower 3-bits 135 enter both an adder 155 and the MUX 150. Also input to the adder 155 is a TOS field 160. In the bundler 35, the decoder 140, the adder 155 and the MUX 150 function as a converter for conversion of the logical register number 133 to a physical register number 180, The output 165 of the adder 155 is input to the MUX 150. The bit 146 selects either the output of the adder 155, which is doing the stacking method 120, 125, or it selects the 3-bits 135, which is the flat method 115. The 3-bit output 170 of the MUX 150 enters the lower 3-bits 175 of a physical register 180 and the upper 4-bits 185 of the physical register number are always 0001. The physical register 180 is what the bundler 35 sends to the execution engine.

Reading or writing some registers can cause "side-effects" in the bundler 35 (e.g., a bit gets set whenever the system writes a particular register). These side-effects are needed to assist in emulating the IA-32 instructions. However, there are times when microcode does not want the side-effects to occur. One way for the microcode to disable the side-effect is to turn off a bit of the register field valid 80 causing the bundler 35 to think that the particular register is not valid.

Figure 6:
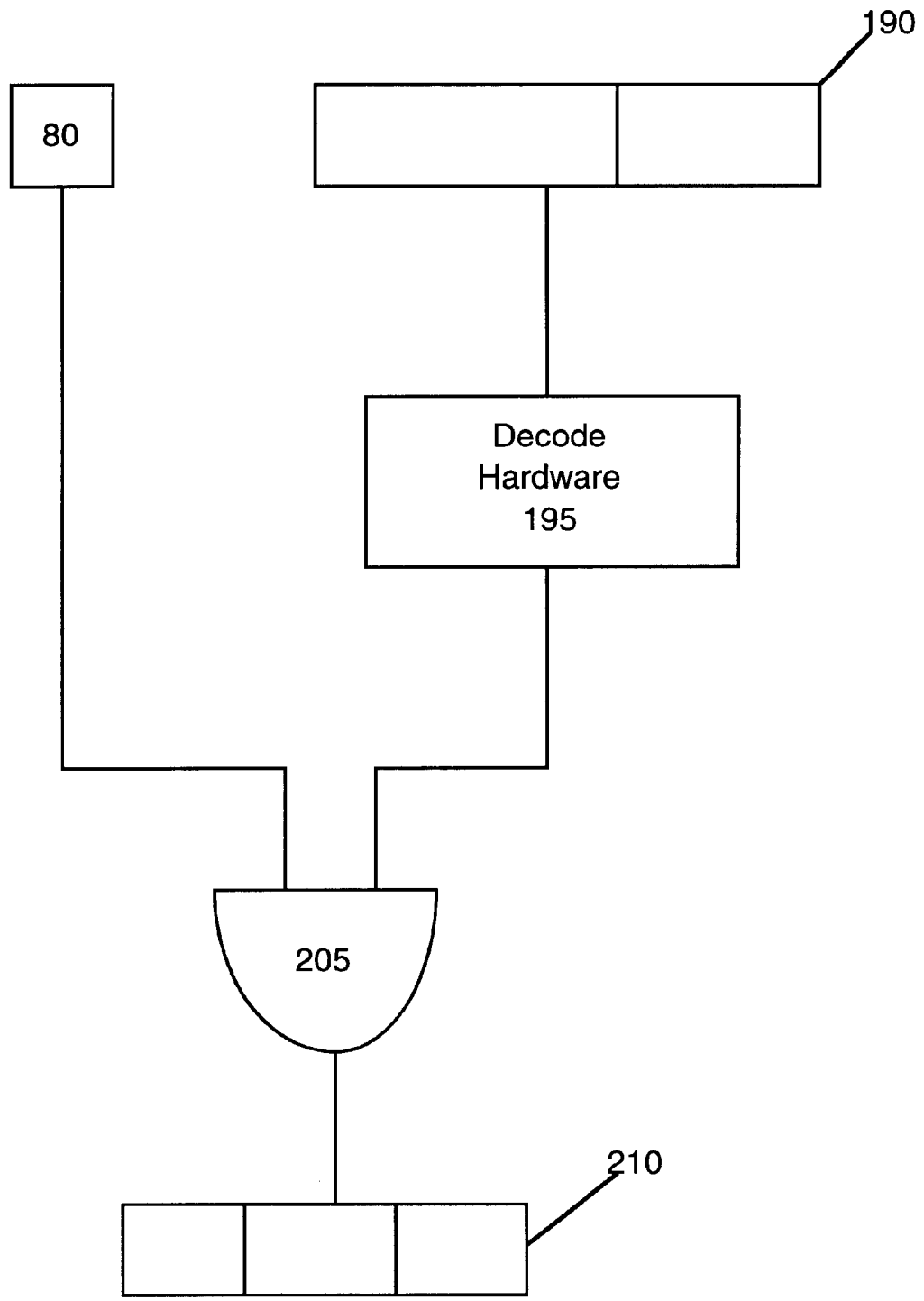
FIG. 6 is a block diagram of the bundler using the register field valid bit to perform side-effects.

FIG. 6 illustrates how the bundler 35 uses the register field valid bit 90 to perform side-effects. A 7-bit register identifier 190 enters decode hardware 195. Both the output of the decode hardware 195 and the register field valid bit 80 are input to an AND gate 205. The output of the AND gate 205 sets a bit in a status register 210, to determine if a particular register is written or read. Setting the bit in the status register 210 is known as the side-effect. If the microcode does not want to have the side-effect to occur, the microcode can set register field valid bit 80 to 0 because this will turn the AND gate 205 off, which in turn means the status register 210 will not get set. However, there is a disadvantage to turning off the register field valid bit 80. The disadvantage is that microcode has to guarantee that there are no dependencies with the register identifier 190, in the instruction before and after.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest reasonable sense unless otherwise indicated.

What is claimed is:

1. A method for use with a microprocessor emulating an emulated instruction set using a native instruction set, wherein the microprocessor contains at least one register, the method comprising:

providing native instructions, wherein one or more of the native instructions emulate an emulated instruction, and wherein each native instruction contains at least one register identifier;

providing at least one validity flag for each native instruction, wherein each of the at least one validity flags indicates whether one of the at least one register identifiers is valid; and dynamically checking for dependencies among the valid register identifiers in the native instructions.

2. The method of claim 1 further comprising:

selecting, on the basis of the dynamically checking step, two or more native instructions for parallel execution.

3. The method of claim 2 further comprising:

executing the native instructions, wherein the selected two or more native instructions are executed in parallel.

4. The method of claim 1 where in the native instruction set is a RISC instruction set and wherein the emulated instruction set is a CISC instruction set.

5. The method of claim 4 wherein the RISC instruction set is an IA-64 instruction set.

6. The method of claim 4 wherein the CISC instruction set is an IA-32 instruction set.

7. The method of claim 1, wherein the at least one register identifier signifies whether the at least one register is from one or more files, where a first register file is different from a second register file.

8. The method of claim 1, wherein one or more most significant bit of the at least one register identifier signifies whether the at least one register is from the one or more files.

9. The method of claim 1 wherein the microprocessor contains N physical registers of a given type, and the emulated instruction set utilizes M register of the given type, where N>M.

10. The method of claim 1, further comprising:

converting a logical register number into a corresponding physical register number understood by the native execution set.

11. The method of claim 10, wherein the converting step further comprising one or more different values for the logical register number are converted to a same value for the physical register number.

12. The method of claim 10, wherein the upper 4-bits of the physical register number is pre-set.

13. The method of claim 1, further comprising setting one or more of the at least one validity flag to an invalid state.

14. An apparatus to use with a microprocessor emulating an emulated instruction set using a native instruction set, wherein the microprocessor contains at least one register, the apparatus comprising:

an execution engine to provide one or more native instructions, wherein the one or more native instructions emulate an emulated instruction, wherein each native instruction contains at least one register identifier;

one or more validity flags are provided to each native instruction, wherein each of the at least one validity flags indicates whether one of the at least one register identifier is valid; and a bundler connected to the execution engine, wherein the bundler checks for dependency among the valid register identifiers in the native instructions.

15. The apparatus of claim 14, wherein the at least one register identifier signifies whether the at least one register is from one or more register files, where the first register file is different from a second register file.

16. The apparatus of claim 15 wherein one or more most significant bit of the at least one register identifier signifies whether the at least one register is from the one or more files.

17. The apparatus of claim 14, further comprising a converter to convert a logical register number into a corresponding physical register number understood by the native execution set.

18. The apparatus of claim 17, wherein at least two different values for the logical register number are converted by the converter to the same value for the physical register number and wherein the upper 4-bits of the physical register number is pre-set.

19. The apparatus of claim 14, further comprising a logical circuit to set one or more of the at least one validity flag to an invalid state.

* * * * *